(12) United States Patent
Yarnall, Jr. et al.

(10) Patent No.: US 6,230,661 B1
(45) Date of Patent: May 15, 2001

(54) EXTERNAL BATTERY ARRANGEMENT FOR ELECTRONIC CONTAINMENT SYSTEMS

(76) Inventors: Robert G. Yarnall, Jr.; Robert G. Yarnall, Sr., both of P.O. Box 758 Ford Rd., Kimberton, PA (US) 19442

( * ) Notice: Subject to any disclaimer, the term of this patent is extended or adjusted under 35 U.S.C. 154(b) by 0 days.

(21) Appl. No.: 09/397,848

(22) Filed: Sep. 17, 1999

(51) Int. Cl.[7] .............................. A01K 15/04; G08B 23/00
(52) U.S. Cl. ..................... 119/721; 119/908; 340/573.4
(58) Field of Search ................................ 119/721, 712, 119/720, 908; 340/573.4, 573.1

(56) References Cited

U.S. PATENT DOCUMENTS

| | | |
|---|---|---|
| 4,208,658 | 6/1980 | Fujiki et al. . |
| 4,225,206 | 9/1980 | Roman, Jr. . |
| 4,229,724 | 10/1980 | Marcus . |
| 4,242,668 | 12/1980 | Herzog . |
| 4,297,684 | 10/1981 | Butter . |
| 4,371,934 | 2/1983 | Wahl et al. . |
| 4,480,310 | 10/1984 | Alvarez . |
| 4,656,476 | 4/1987 | Tavtigian . |
| 4,733,633 | 3/1988 | Yarnall, Sr. et al. . |
| 4,745,882 | 5/1988 | Yarnall, Sr. et al. . |
| 4,898,120 | 2/1990 | Brose . |
| 4,967,695 | 11/1990 | Giunta . |
| 4,996,945 | 3/1991 | Dix, Jr. . |
| 5,067,441 | 11/1991 | Weinstein . |
| 5,121,711 | 6/1992 | Aine . |
| 5,161,485 | 11/1992 | McDade . |
| 5,170,149 | 12/1992 | Yarnall, Sr. et al. . |
| 5,207,178 | 5/1993 | McDade et al. . |
| 5,241,923 | 9/1993 | Janning . |
| 5,266,944 | 11/1993 | Carroll et al. . |
| 5,425,330 | 6/1995 | Touchton et al. . |
| 5,435,271 | 7/1995 | Touchton et al. . |
| 5,460,124 | 10/1995 | Grimsley et al. . |
| 5,565,850 | 10/1996 | Yarnall, Jr. et al. . |
| 5,610,588 | 3/1997 | Yarnall, Jr. et al. . |
| 5,769,032 | 6/1998 | Yarnall, Sr. et al. . |
| 5,781,113 | 7/1998 | Yarnall, Sr. et al. . |
| 5,808,551 | 9/1998 | Yarnall, Jr. et al. . |
| 5,844,489 | 12/1998 | Yarnall, Jr. et al. . |
| 5,911,198 | 6/1999 | Curen et al. . |
| 5,911,199 * | 6/1999 | Farkas et al. ........................ 119/859 |
| 6,003,474 * | 12/1999 | Slater et al. ......................... 119/859 |
| 6,104,295 * | 8/2000 | Gaisser et al. ..................... 340/573.4 |

* cited by examiner

Primary Examiner—Charles T. Jordan
Assistant Examiner—Yvonne R. Abbott
(74) Attorney, Agent, or Firm—Ratner & Prestia

(57) ABSTRACT

An electronic containment system for use with animals and/or humans. The system has a transmitter for transmitting a radio signal, a receiver for receiving the radio signal from the transmitter and a power source separate from the receiver. The system also includes a collar or a belt to attach the receiver and the battery to the animal and/or human. The receiver is attached to a first position on the collar and the power source is attached to a second position on the collar.

23 Claims, 7 Drawing Sheets

EXTERNAL BATTERY ARRANGEMENT FOR ELECTRONIC CONTAINMENT SYSTEMS

FIELD OF THE INVENTION

The present invention relates to animal and/or human electronic containment systems and, more particularly, to an electronic containment system which includes a radio receiver with an independently located power supply mounted within or on the animal's collar; and a radio transmitter that may be permanently affixed or portable which transmits the predetermined containment signal.

BACKGROUND OF THE INVENTION

One system for accomplishing the confinement of an animal is disclosed in U.S. Pat. No. 5,207,178 entitled ELECTRODE DEVICE FOR AN ELECTRIC SHOCK GENERATOR CARRIED ON AN ANIMAL (the '178 patent), issued to McDade et al. The '178 patent and other similar conventional systems mount a receiver on a collar of an animal. The collar delivers a shock to the animal wearing the collar when the animal is in relatively close proximity to a perimeter antenna wire. This conventional system incorporates a battery supply inside the animal's receiver encasement. This approach, however, greatly increases the size and weight of the receiver encasement unit.

Another system for accomplishing the confinement of an animal is disclosed in U.S. Pat. No. 5,911,198 entitled ANIMAL STIMULATOR (the '198 patent) issued to Curen, et al. The '198 patent incorporates one or more photovoltaic cells, battery management circuitry, support hardware for attaching the photovoltaic cells and battery management circuitry in the animal's collar, in addition to a conventional power supply and receiver. This additional circuitry greatly adds to the weight and size of the collar and increases the manufacturing cost of the unit.

Another conventional confinement system is described in U.S. Pat. No. 5,241,923 entitled TRANSPONDER CONTROL OF ANIMAL WHEREABOUTS (the '923 patent), issued to Janning. The '923 patent describes a confinement system that utilizes stationary and/or mobile transponders. The transponders are placed to determine the outer containment area of an animal or human. As with the aforementioned prior art, a receiver is mounted on a collar worn by the animal. The collar delivers a shock to an animal wearing the collar when the animal is in relatively close proximity of the transponders. This system also incorporates a battery supply inside the animal's receiver encasement. As such, this system exhibits the same disadvantages as the aforementioned conventional systems.

Yet another system for the confinement of an animal is disclosed in U.S. Pat. No. 4,898,120 entitled ANIMAL TRAINING AND RESTRAINING SYSTEM (the '120 patent), issued to Brose. This system utilizes a centralized transmitter that broadcasts a predetermined radio signal. Unlike the other prior art, the animal must stay in the broadcast containment field. When the animal's receiver detects that the containment field is weakening, as the animal's distance from the transmitter increases, the animal's receiver administers a deterrent to the animal. This system also incorporates a battery supply inside of the animal's receiver encasement. As with the other systems, this greatly increases the size and weight of the receiver encasement.

Bearing in mind the problems and deficiencies of the prior art, it is therefore an object of the present invention to provide an electronic containment system in which the battery is separate from the receiver. It is a further object of the present invention to provide a separate encasement for each of the receiver and the battery so that the collar worn by the animal has a low profile. It is yet another object of the present invention to provide a collar where the weight of the receiver and its associated components are more evenly distributed along the collar so that the collar it is more comfortable and less obtrusive.

SUMMARY OF THE INVENTION

The present invention provides an animal confinement system including a base for transmitting a predetermined containment signal; a receiver that is worn by the animal or human being contained; and a power supply that is affixed to or contained within the collar and not within the receiver encasement.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE PREFERRED EMBODIMENTS

Generally, the confinement system for animals of the present invention operates by transmitting a signal to a receiver mounted on an animal's collar. The transmitted signal is then detected by the receiver. If the transmitted signal and a reference signal within the receiver are similar, then the signal strength of the transmitted signal is used to determine whether the animal is close to a boundary area. If the transmitted signal and reference signals are not similar, the transmitted signal is ignored. Although the exemplary embodiments illustrate the use of the confinement system by attaching the receiver to an animal, the receiver can also be attached to a person, using a belt for example, and used as described below.

Figure 1:
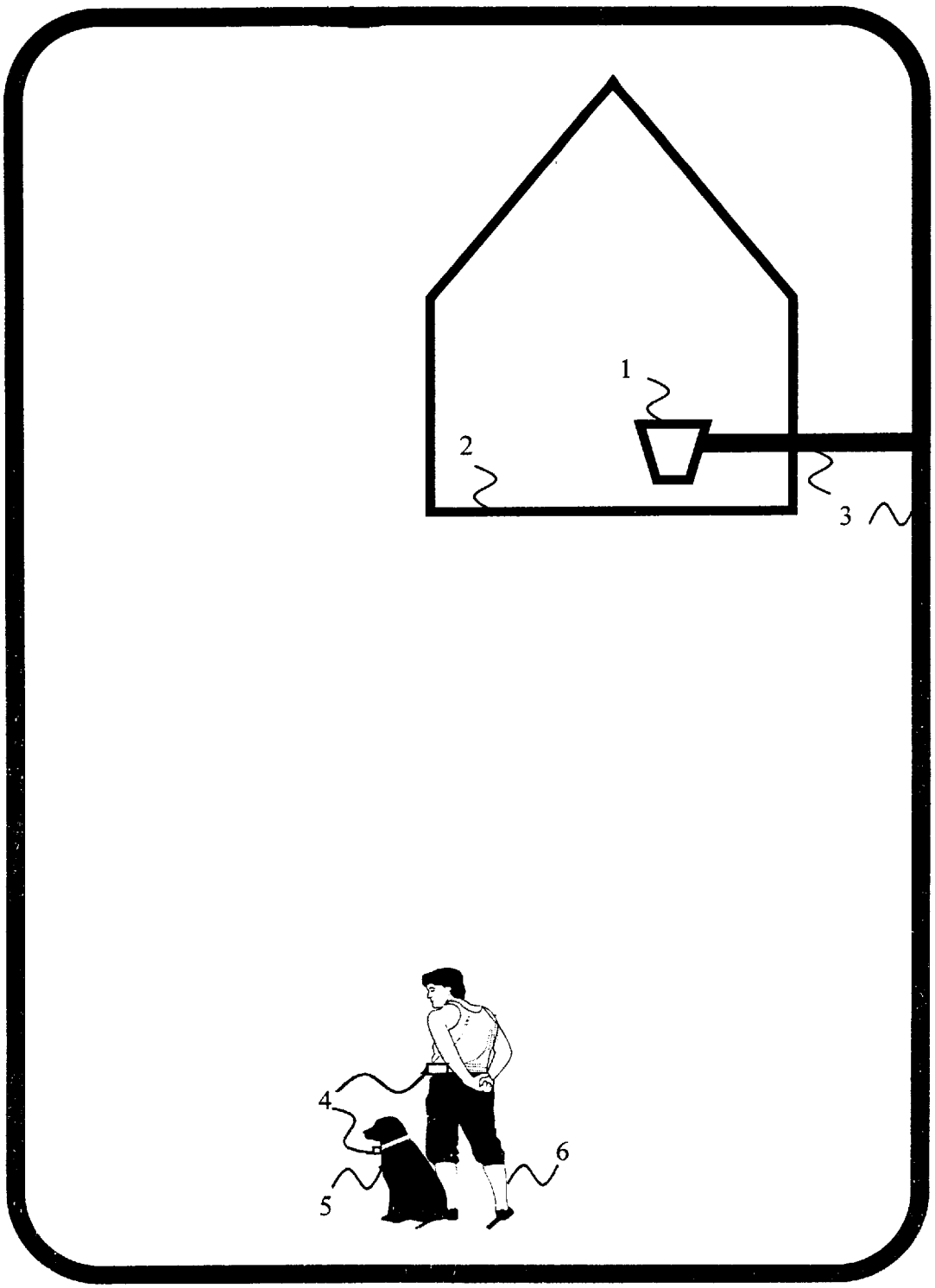
FIG. 1 is an illustration of a first exemplary embodiment of the present invention. This exemplary embodiment utilizes a permanently affixed outer perimeter containment wire attached to a stationary transmitting base station. When the receiver, worn by an animal or human, is in close proximity of the outer wire, the receiver will administer an audio signal and/or shock as a deterrent.

Referring to FIG. 1, a first exemplary embodiment of the present invention is shown. In FIG. 1, TRANSMITTER 1 transmits a predetermined modulated signal of 30 kHz, for example, through permanently affixed ANTENNA 3. In FIG. 1, TRANSMITTER 1 is located in a STRUCTURE 2 such as a house or a garage, for example. ANIMAL 5 and/or HUMAN 6 wears RECEIVER 4, which responds to the predetermined containment signal of TRANSMITTER 1. When ANIMAL 5 and/or HUMAN 6 comes in close proximity with ANTENNA 3 (5–10 feet for example), RECEIVER 4 becomes energized and may emit and an annoying sound, a shock, or an annoying sound and a shock to ANIMAL 5 and/or HUMAN 6. Thus, deterring them from crossing the predetermined containment area (not shown).

Figure 2:
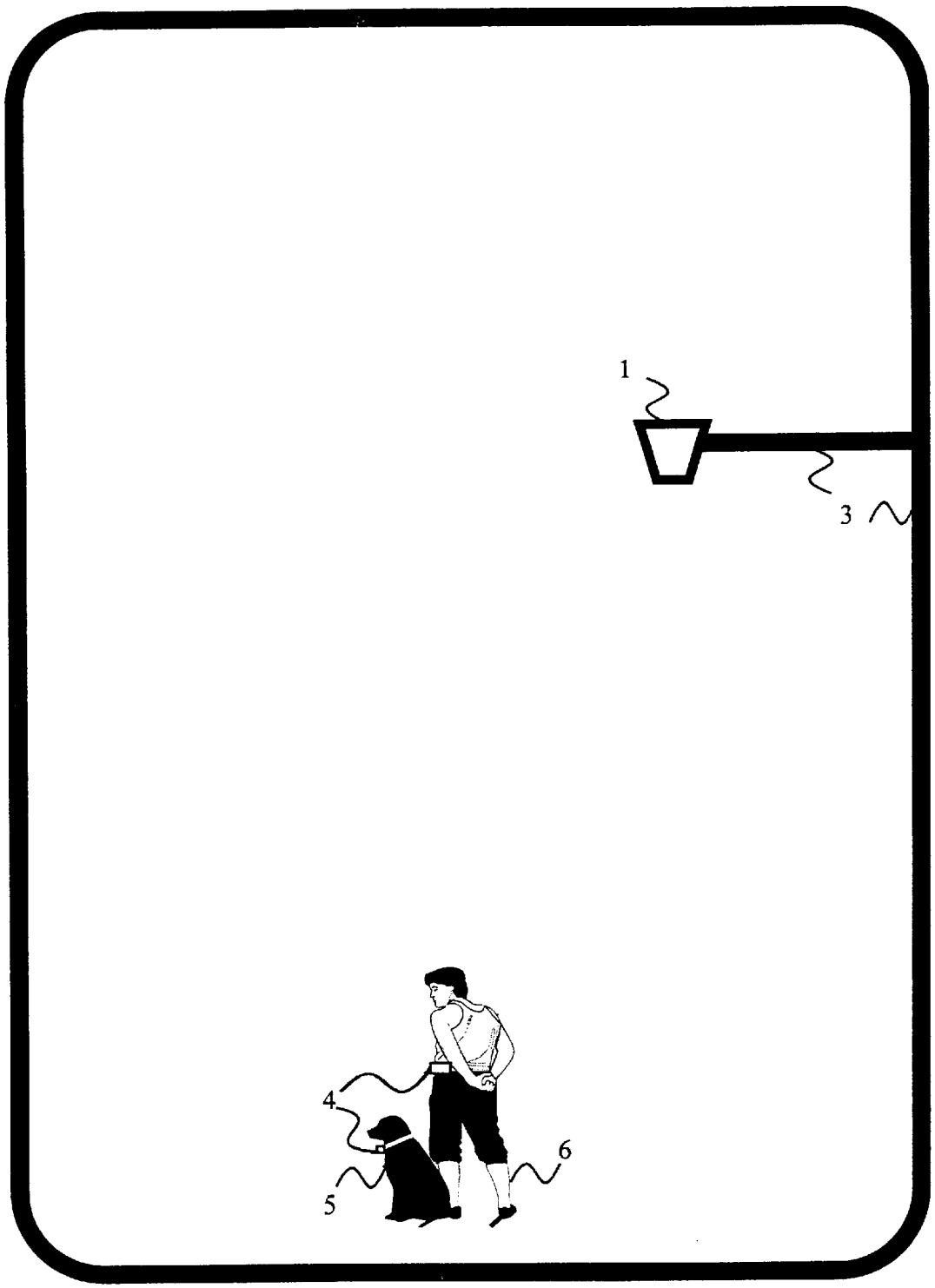
FIG. 2 is an illustration of a second exemplary embodiment of the present invention. This exemplary embodiment utilizes a portable outer perimeter containment wire attached to a mobile transmitting base station. When the receiver, worn by an animal or human, is in close proximity of the outer wire, the receiver will administer an audio signal and/or shock as a deterrent.

Referring to FIG. 2, there is shown a second exemplary embodiment illustrating a portable usage of the invention. In FIG. 2, TRANSMITTER 1 transmits a predetermined modulated signal of about 30 kHz, for example, through ANTENNA 3. In FIG. 2, TRANSMITTER 1 is portable and may be placed in an open field, playground, seashore area, etc. ANIMAL 5 and/or HUMAN 6 wears RECEIVER 4, which responds to the predetermined containment signal of TRANSMITTER 1. When ANIMAL 5 and/or HUMAN 6 comes in close proximity of ANTENNA 3 (5 to 10 feet for example), RECEIVER 4 becomes energized and may emit an annoying sound, a shock, or an annoying sound and a shock to ANIMAL 5 and/or HUMAN 6. Thus, deterring them from crossing the predetermined containment area.

Figure 3:
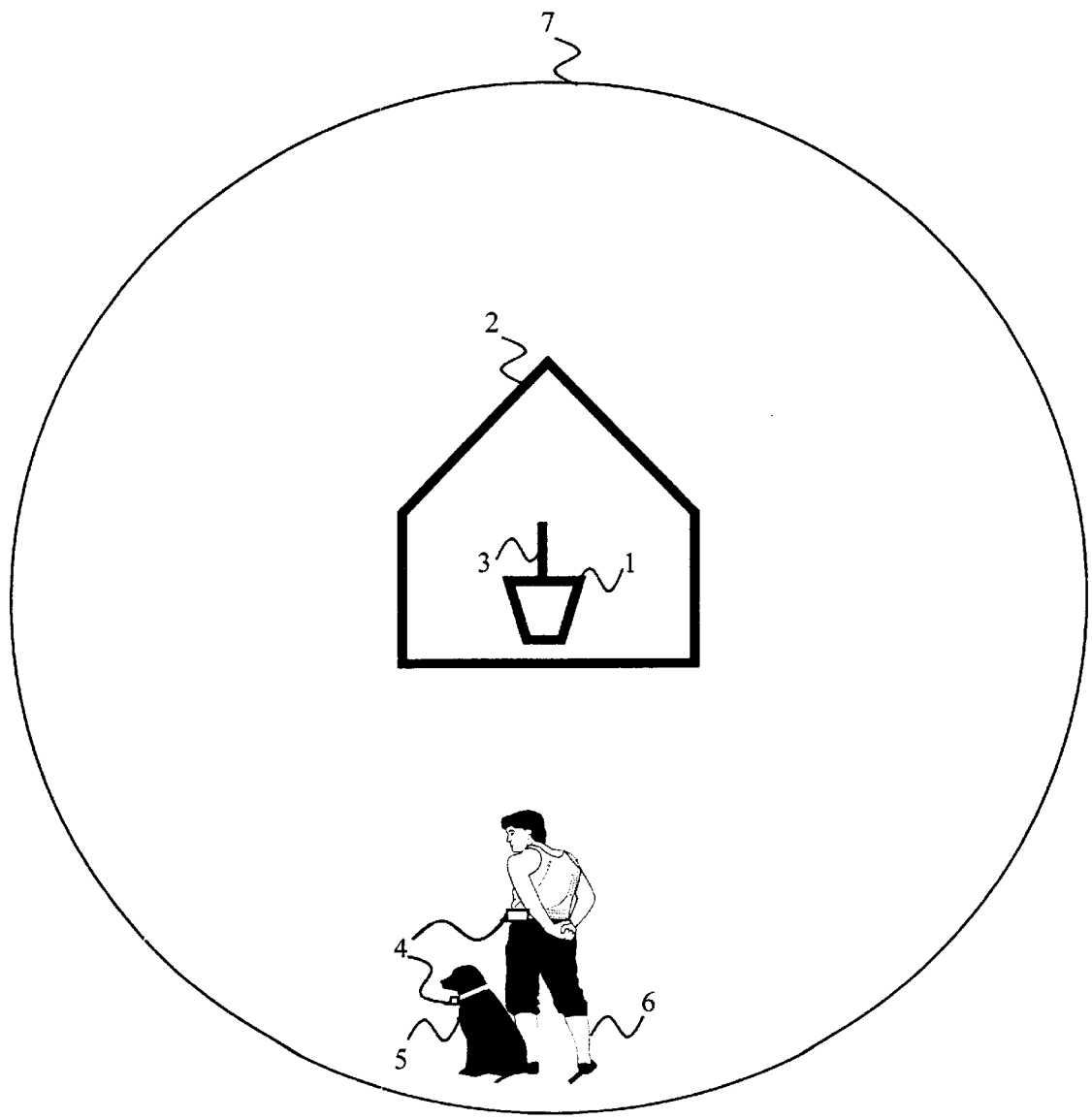
FIG. 3 is an illustration of a third exemplary embodiment of the present invention. This exemplary embodiment utilizes a permanently affixed transmitting antenna and a stationary transmitting base station. When an animal or human, wearing the receiver, ventures away or out of the containment area, the receiver will administer an audio signal and/or shock as a deterrent.

Referring to FIG. 3, there is shown an alternate portable usage of the present invention. In FIG. 3, TRANSMITTER 1 transmits a predetermined modulated signal of about 30 kHz, for example, through ANTENNA 3. TRANSMITTER 1 is located in a STRUCTURE 2 such as a house or a garage, for example. ANIMAL 5 and/or HUMAN 6 wears RECEIVER 4, which responds to the predetermined containment signal of TRANSMITTER 1. Unlike the first and second exemplary embodiments discussed above, the ANIMAL 5 and/or HUMAN 6 must stay within the BROADCAST FIELD 7, (50 to 100 feet from ANTENNA 3, for example). No outer perimeter wire needs to be installed. RECEIVER 4 becomes energized when no containment signal is detected and may emit an annoying sound, a shock, or an annoying sound and a shock to ANIMAL 5 and/or HUMAN 6. Thus, deterring them from crossing the predetermined containment area.

Figure 4:
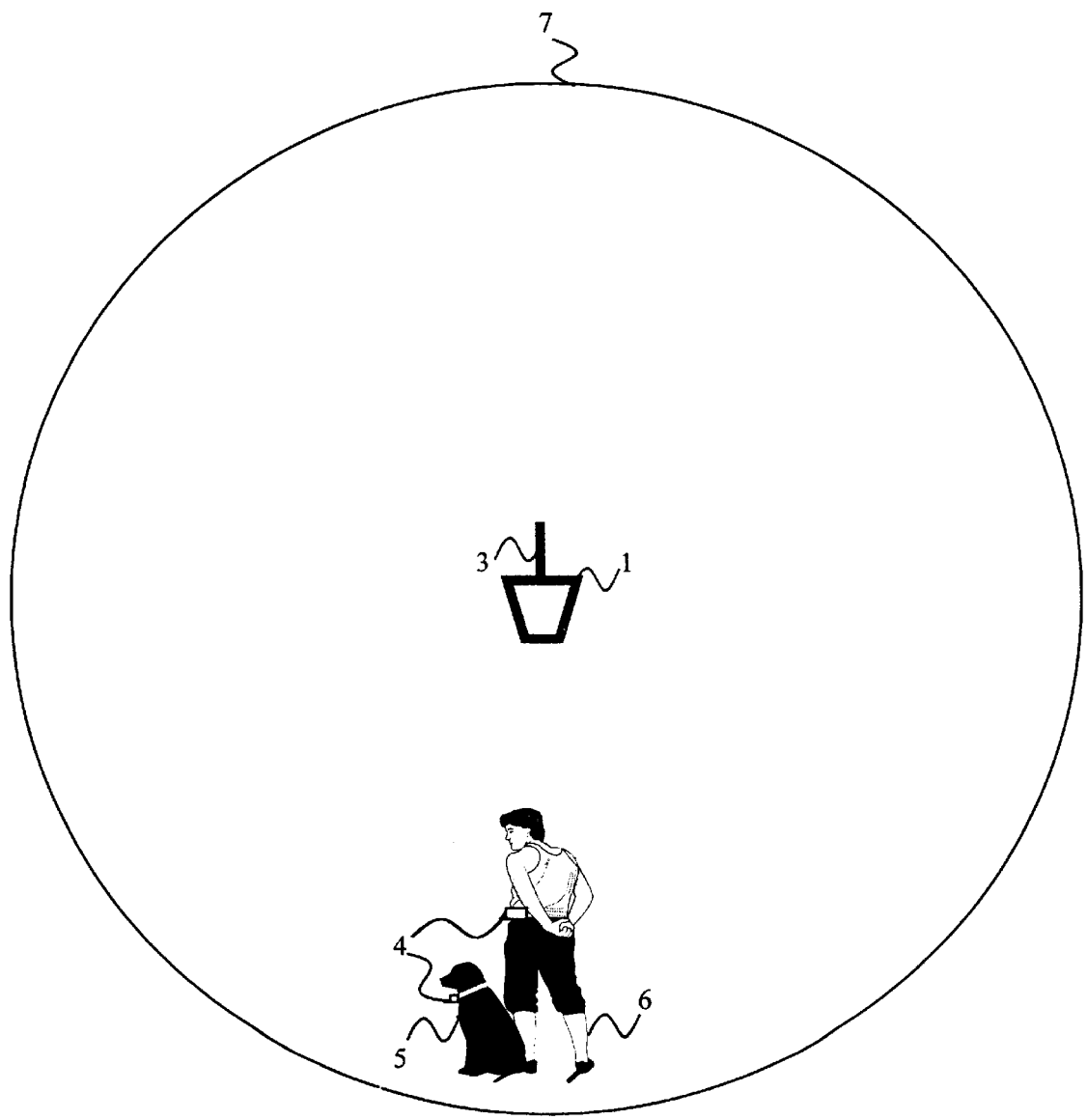
FIG. 4 is an illustration of a fourth exemplary embodiment of the present invention. This exemplary embodiment utilizes a portable outer perimeter containment wire attached to a mobile transmitting base station. When an animal or human, wearing the receiver, ventures away or out of the containment area, the receiver will administer an audio signal and/or shock as a deterrent.

Referring to FIG. 4, there is shown another alternate portable usage of the present invention. In FIG. 4, TRANSMITTER 1 transmits a predetermined modulated signal of about 30 kHz, for example, through ANTENNA 3. TRANSMITTER 1 is portable and may be placed in an open field, playground, seashore area, etc. ANIMAL 5 and/or HUMAN 6 wears RECEIVER 4 that responds to the predetermined containment signal of TRANSMITTER 1. Unlike the first and second exemplary embodiments, the ANIMAL 5 and/or HUMAN 6 must stay within the BROADCAST FIELD 7, (50 to 100 feet from ANTENNA 3, for example). No outer perimeter wire needs to be installed. RECEIVER 4 becomes energized when no containment signal is detected and may emit an annoying sound, a shock, or an annoying sound and a shock to ANIMAL 5 and/or HUMAN 6. Thus, deterring them from crossing the predetermined containment area.

Figure 5:
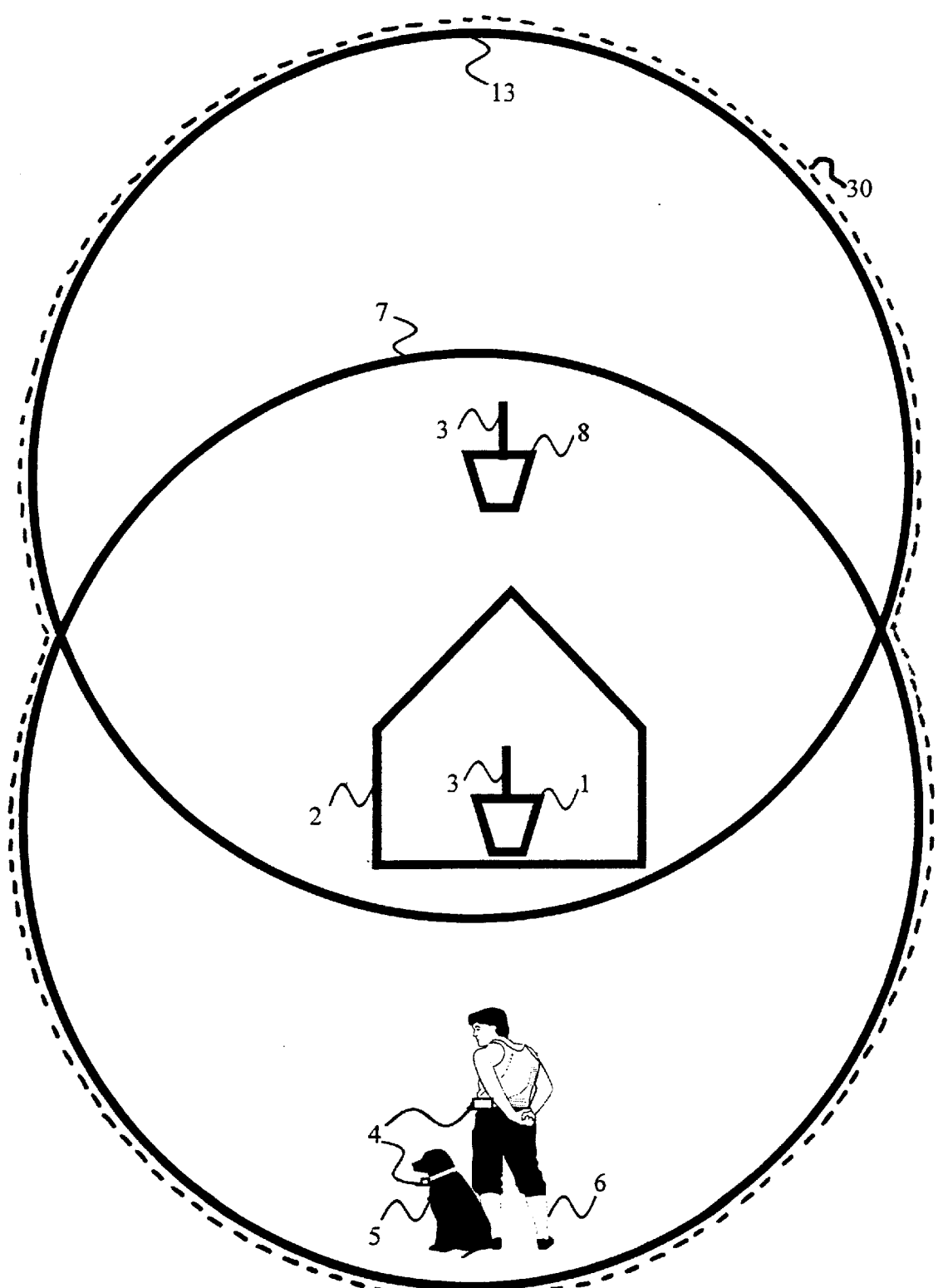
FIG. 5 is an illustration of a fifth exemplary embodiment of the present invention. This exemplary embodiment utilizes multiple transmitters to extend the containment field. When an animal or human, wearing the receiver, ventures away or out of the containment area, the receiver will administer an audio signal and/or shock as a deterrent.

FIG. 5 illustrates a fifth exemplary embodiment of the present invention. In FIG. 5, additional portable transmitters 8 may be placed to extend the containment field. As each additional transmitter 8 generates its own containment field 13, placement of additional transmitters 8, such that their respective containment fields overlap one another, provides a single larger containment field 30. The size and shape of the containment field 30 may be adjusted by moving transmitters 1 and 8 as desired.

Figure 6:
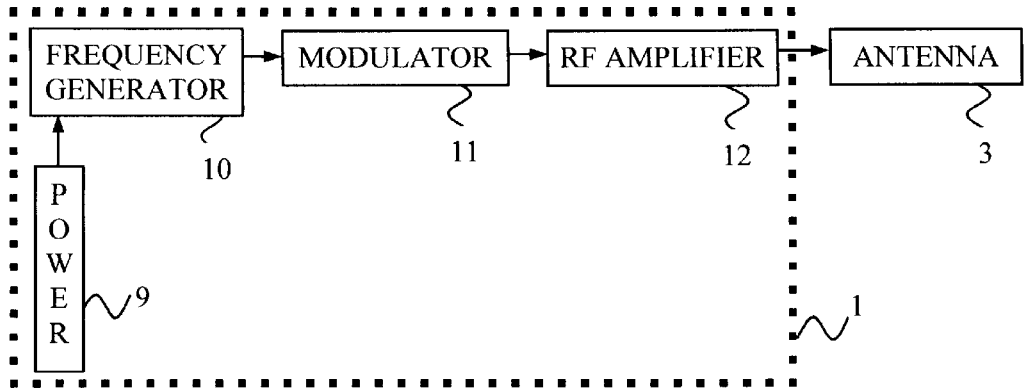
FIG. 6 is a block diagram of a containment transmitter according to an exemplary embodiment of the present invention.

Referring to FIG. 6, a block diagram of a transmitter according to an exemplary embodiment of the present invention is shown. In FIG. 6, TRANSMITTER 1 consists of POWER SOURCE 9, FREQUENCY GENERATOR 10, MODULATOR 11 and RF AMPLIFIER 12. A modulated RF signal of about 33.4 kHz, for example, is broadcast by TRANSMITTER 1 thought ANTENNA 3 as a containment field signal.

Figure 7:
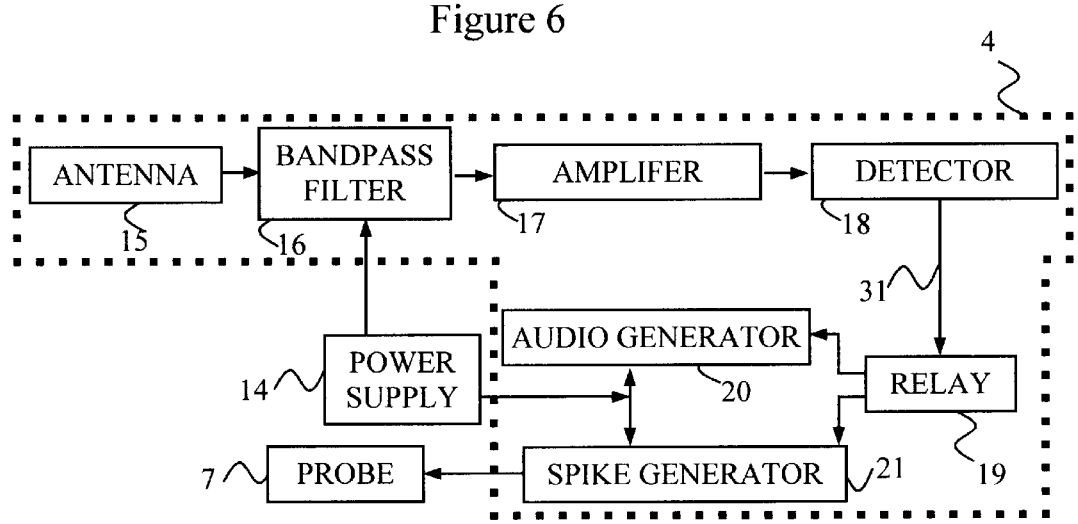
FIG. 7 is a block diagram of a receiver worn by the animal or human according to an exemplary embodiment of the present invention.

Referring to FIG. 7, a block diagram of a receiver, deterrent circuit and power source according to an exemplary embodiment of the present invention is shown. In the exemplary embodiment, RECEIVER 4 includes ANTENNA 15, BANDPASS FILTER 16, AMPLIFIER 17, DETECTOR 18, RELAY 19, AUDIO GENERATOR 20 and SPIKE GENERATOR 21. The RELAY 19, AUDIO GENERATOR 20 and SPIKE GENERATOR 21 may be considered the deterrent circuit. The RECEIVER 4 is supplied by POWER SUPPLY 14, such as a battery.

In FIG. 7, the modulated RF signal transmitted by TRANSMITTER 1 is picked up by ANTENNA 15 as the animal nears the outer loop (formed by ANTENNA 3, for example). The signal then passes through BANDPASS FILTER 16. BANDPASS FILTER 16 preferably eliminates frequencies above and below those used by the confinement system. In the exemplary embodiment of FIG. 7, 34 kHz is chosen as the upper limit of BANDPASS FILTER 16 and 33 kHz is chosen as the lower limit. Alternatively, a pair of band rejection filters having frequencies of 33 kHz and 34 kHz, respectively, may also be used. In general, any filtering scheme capable of limiting the frequency range of the signal passing through the remainder of RECEIVER 4 may be used.

Referring again to FIG. 7, the output signal from BANDPASS FILTER 16 is provided as an input to AMPLIFIER 17.

The amplified signal output by AMPLIFIER 18 is sent to DETECTOR 18. DETECTOR 18, which may be a phase detector, will detect the presence of the known frequency (33.4 kHz, for example) of the containment signal sent by TRANSMITTER 1, and produce as an output a control signal 31 to RELAY 19. RELAY 19 is utilized to trigger AUDIO GENERATOR 20, which emits an unpleasant sound to the animal (for example, a dog whistle). Additionally, RELAY 19 powers SPIKE GENERATOR 21 which produces a pulse output of sufficient voltage and current so as to give the animal a mild electrical shock via PROBE 7. In the operation of the present invention, RELAY 19 may be set to operate only AUDIO GENERATOR 20, SPIKE GENERATOR 21, or a combination of AUDIO GENERATOR 20 and SPIKE GENERATOR 21. RECEIVER 4 is supplied by POWER SUPPLY 14, which is independently housed from the RECEIVER 4 in a separate section of the collar.

DETECTOR 18 may either be set at time of manufacture to activate RELAY 19 and its associated circuitry only in the presence of the predetermined containment signal (as discussed in the first and second exemplary embodiments), or may be set at time of manufacture to activate RELAY 19 and its associated circuitry only in the absence of the predetermined containment signal (as discussed in the third and fourth exemplary embodiments).

Figure 8:
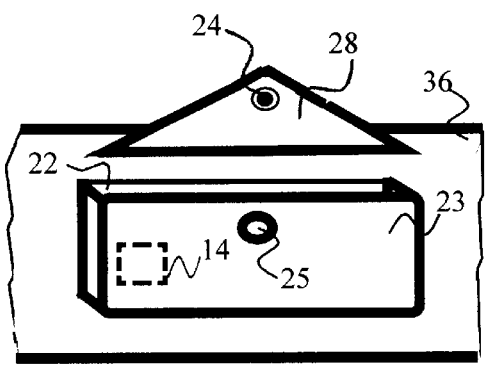
FIG. 8 is a view of a containment collar arrangement illustrating an exemplary embodiment of a housing for use with the collar.

FIG. 8 illustrates an exemplary embodiment for encasing the RECEIVER 4 and/or POWER SUPPLY 14 within collar 36. In FIG. 7, POWER SUPPLY 14 may be placed in AREA 22 of POUCH 23, which is part of COLLAR 36. AREA 22 may be accessed by lifting FLAP 28. Outer SNAP 24 is pressed into inner SNAP 25 to secure RECEIVER 4 and/or POWER SUPPLY 14 within the collar 36. As mentioned above, RECEIVER 4 is housed separately from POWER SUPPLY 14. Therefore, in order to encase both POWER SUPPLY 14 and RECEIVER 4, separate pouches 23 are needed for each.

Figure 9:
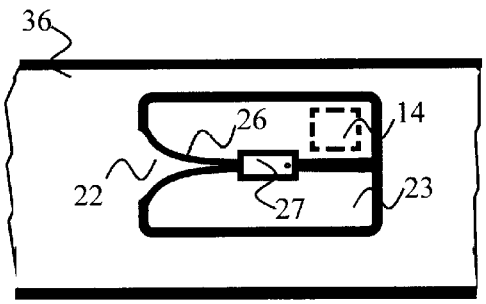
FIG. 9 is a view of a containment collar arrangement illustrating another exemplary embodiment of a housing for use with the collar.

FIG. 9 illustrates another exemplary embodiment for encasing the RECEIVER 4 and/or POWER SUPPLY 14 within collar 36. In FIG. 9, POWER SUPPLY 14 may be placed in AREA 22 that is surrounded by POUCH 23. AREA 22 my be accessed by pulling TAB 27 of ZIPPER 26 to secure RECEIVER 4 and/or POWER SUPPLY 14 within the collar 36. As above, separate pouches 23 are needed for RECEIVER 4 and POWER SUPPLY 14.

Figure 10:
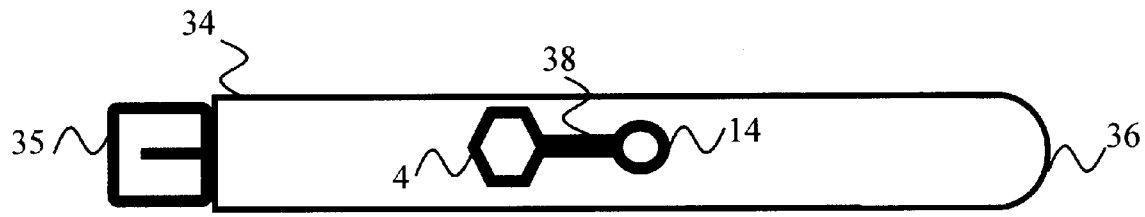
FIG. 10 is a plan view of a containment collar arrangement in which the power source is not within with the receiver encasement.

FIG. 10 is a plan view of another exemplary embodiment of collar 36 and its components. In FIG. 10, collar BUCKLE 35 is used to secure the collar 36 to the animal 5 or person 6. BELT 34 is the outer layer of collar 36 where RECEIVER 4 and POWER SUPPLY 14 are attached. RECEIVER 4 and POWER SUPPLY 14 are electrically connected to one another through WIRES 38. BELT 34 may be comprised of leather, cloth, nylon, plastic, or any material that has the ability to be fashioned into a collar.

Figure 11:
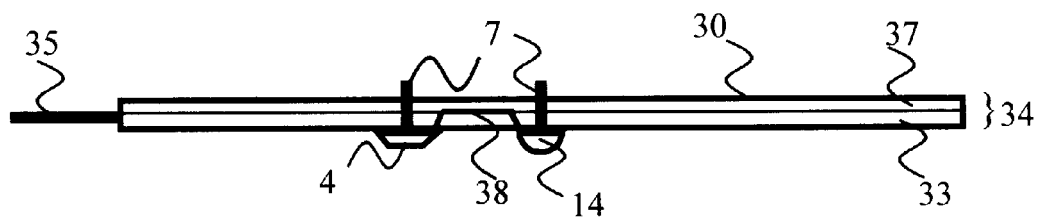
FIG. 11 illustrates the placement of the receiver and the power source affixed to the outside of the collar.

FIG. 11 is a side view of another exemplary embodiment of collar 36 and its components. In FIG. 11, RECEIVER 4 and POWER SUPPLY 14 are attached to the outside of belt 34. Electrical connection WIRES 38 are placed between outer BELT LAYER 33 and inner BELT LAYER 37. PROBES 7 are attached to the outside of inner BELT LAYER 37 to administer an electric shock to the animal 5 or human 6.

Figure 12:
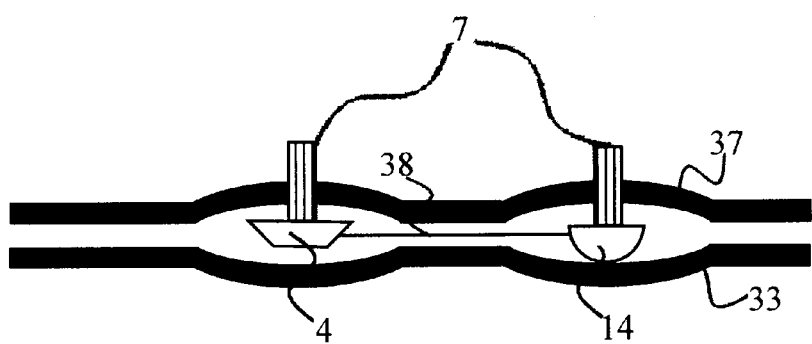
FIG. 12 illustrates an alternate placement of the receiver and the power source within of the collar.

FIG. 12 is a side view of yet another exemplary embodiment of collar 36 and its components. In FIG. 12, RECEIVER 4, POWER SUPPLY 14 and electrical connection WIRES 38 are placed between outer BELT LAYER 33 and inner BELT LAYER 37. PROBES 7 are attached to the outside inner BELT LAYER 37 to administer an electric shock to the animal 5 or human 6. This approach allows COLLAR 36 to be made so as to have a lower profile than collars in which the receiver and deterrent circuit are located or contained in a single housing.

Although the above description speaks in terms of a collar, its teachings may be applied to a belt or the like for use by a human.

As described above, the present invention provides a lower collar in which weight and size are more uniformly distributed along the collar of an animal or a belt worn by a human.

Although the invention is illustrated and described herein, the invention is not intended to be limited to the details shown. Rather, various modifications may be made in the details within the scope and range of equivalents of the claims and without departing from the invention.

What is claimed:

1. An electronic containment system for use with at least one of an animal and a human, the system comprising:
    a transmitter for transmitting a predetermined radio signal defining a containment area;
    a further transmitter placed at least one of i) below ground level, ii) above ground level and iii) at ground level, the further transmitter transmitting a further predetermined radio signal defining an additional containment area;
    a receiver for receiving the radio signal from at least one of the transmitter and the further transmitter;
    a power source separate from the receiver to provide power to the receiver; and
    attaching means for attaching the receiver and the power source to one of the animal and the human, the receiver coupled to the attaching means at a first position and the power source coupled to the attaching means at a second position.

2. An electronic containment system according to claim 1, further comprising a deterrent circuit for administering a deterrent responsive to a control signal from the receiver.

3. An electronic containment system according to claim 2, wherein the deterrent is at least one of an audible signal and a shock.

4. An electronic containment system according to claim 2, wherein the power source provides power to the deterrent circuit.

5. An electronic containment system according to claim 2, wherein the receiver generates the control signal responsive to the radio signal transmitted by the transmitter.

6. An electronic containment system according to claim 5, wherein the receiver generates the control signal when one of the animal and the human attempts to leave a predetermined containment area defined by the radio containment signal.

7. An electronic containment system according to claim 1, wherein the receiver is attached to an inside portion of the attaching means.

8. An electronic containment system according to claim 1, wherein the attaching means is one of a collar and a belt worn by one of the animal and the human.

9. An electronic containment system according to claim 1, wherein at least a portion of the additional containment area overlaps at least a portion of the containment area.

10. An electronic containment system according to claim 1, wherein the further transmitter is at least one of a stationary and a portable transmitter.

11. An electronic containment system according to claim 1, wherein the power source is coupled to an inside portion of the attaching means.

12. An electronic containment system according to claim 1, wherein the power source is a battery.

13. An electronic containment system according to claim 1, further comprising:
- at least one permanently affixed antenna coupled to the transmitter, the at least one antenna including an antenna pod placed at a perimeter of the predefined containment area.

14. An electronic containment system according to claim 13, wherein the receiver is activated and generates a control signal to a deterrent circuit when the receiver detects the predetermined containment signal emitted by the perimeter antenna pod.

15. An electronic containment system according to claim 13, wherein the receiver is activated and applies the deterrent when the receiver detects an absence of the predetermined radio signal broadcast by the perimeter antenna pod.

16. An electronic containment system according to claim 1, further comprising:
- at least one permanently affixed antenna coupled to the transmitter, the at least one antenna including a wire placed one of i) below ground level, ii) at ground level, and iii) above ground level to define a containment area for at least one of the animal and the human being contained.

17. An electronic containment system for use with at least one of an animal and a human, the system comprising:
- a transmitter for transmitting a predetermined radio signal defining a containment area;
- a receiver for receiving the radio signal from the transmitter;
- a power source separate from the receiver to provide power to the receiver;
- attaching means for attaching the receiver and the power source to one of the animal and the human, the receiver coupled to the attaching means at a first position and the power source coupled to the attaching means at a second position; and
- an encasement coupled to a surface of the attaching means, the power source coupled to an inside portion of the encasement.

18. An electronic containment system according to claim 17, further comprising closing means for closing the encasement.

19. An electronic containment system according to claim 17, further comprising a second encasement separate from the first encasement, and coupled to the surface of the attaching means, the receiver coupled to an inside portion of the second encasement.

20. An electronic containment system according to claim 19, further comprising closing means for closing the second encasement.

21. An electronic containment system for use with at least one of an animal and a human, the system comprising:
- a transmitter for transmitting a predetermined radio signal defining a containment area;
- a receiver for receiving the radio signal from the transmitter;
- at least one permanently affixed antenna coupled to the transmitter, the at least one antenna including an antenna pod placed at a perimeter of the predefined containment area;
- a power source separate from the receiver to provide power to the receiver; and
- attaching means for attaching the receiver and the power source to the animal and the human, the receiver coupled to the attaching means at a first position and the power source coupled to the attaching means at a second position;
- wherein the perimeter antenna pod is at least i) a plurality of antenna pods and ii) one of a portable antenna pod and a fixed antenna pod, and the receiver is activated and generates a control signal to a deterrent circuit when the receiver detects the predetermined containment signal emitted by the perimeter antenna pod.

22. An electronic containment system for use with at least one of an animal and a human, the system comprising:
- a transmitter for transmitting a predetermined radio signal defining a containment area;
- a further transmitter placed at least one of i) below ground level, ii) above ground level and iii) at ground level, the further transmitter transmitting a further predetermined radio signal defining an additional containment area;
- a receiver for receiving the radio signal from at least one of the transmitter and the further transmitter; and
- attaching means for attaching the receiver and the power source to one of the animal and the human, the receiver coupled to the attaching means at a first position and the power source coupled to the attaching means at a second position.

23. An electronic containment system for use with at least one of an animal and a human, the system comprising:
- a transmitter for transmitting a predetermined radio signal defining a containment area;
- a receiver for receiving the radio signal from the transmitter;
- at least one permanently affixed antenna coupled to the transmitter, the at least one antenna including an antenna pod placed at a perimeter of the predefined containment area; and
- attaching means for attaching the receiver to one of the animal and the human, the receiver coupled to the attaching means;
- wherein the perimeter antenna pod is at least one of i) a plurality of antenna pods and ii) one of a portable antenna pod and a fixed antenna pod, and the receiver is activated and generates a control signal to a deterrent circuit when the receiver detects the predetermined containment signal emitted by the perimeter antenna pod.

* * * * *